United States Patent
Hoerster

(12) 
(10) Patent No.: US 6,276,228 B1
(45) Date of Patent: Aug. 21, 2001

(54) PEDAL MOUNTING APPARATUS FOR MOUNTING PEDALS IN MOTOR VEHICLES

(75) Inventor: Jochen Hoerster, Cologne (DE)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/267,253

(22) Filed: Mar. 12, 1999

(30) Foreign Application Priority Data

Mar. 13, 1998 (EP) .................................................. 98104557

(51) Int. Cl.[7] ...................................................... G05G 1/14
(52) U.S. Cl. ................................................................ 74/512
(58) Field of Search ........................... 74/512, 513, 560; 280/748; 180/271; 188/371, 376, 377

(56) References Cited

U.S. PATENT DOCUMENTS

| | | | |
|---|---|---|---|
| 3,151,499 | * 10/1964 | Roe ......................................... | 74/560 |
| 6,082,219 | * 7/2000 | Wolpert ................................... | 74/512 |
| 6,089,119 | * 7/2000 | Leboisne et al. ....................... | 74/512 |
| 6,101,894 | * 8/2000 | Tiemann et al. ........................ | 74/512 |
| 6,109,164 | * 8/2000 | Okahara et al. ........................ | 91/376 |
| 6,112,616 | * 9/2000 | Schonlau et al. ....................... | 74/512 |

FOREIGN PATENT DOCUMENTS 35-33-420-A1     9/1985  (DE) .

* cited by examiner

Primary Examiner—David A. Bucci
Assistant Examiner—Vicky A. Johnson
(74) Attorney, Agent, or Firm—Gregory P. Brown; William J. Coughlin

(57) ABSTRACT

In a bearing bracket for pedals in motor vehicles comprising a supporting bracket (8) having its base fixed to a substantially vertical region (2) of the bulkhead/cowl panel assembly (1) and a bearing bracket (9) having its base fixed to a substantially horizontal region (3) of the bulkhead/cowl panel assembly (1), with the pivot axle (7) of the pedals, for example of a brake pedal (6), being held stably and pivotally, the pedals, e.g. a brake pedal (6), are provided with a stop arm (11) projecting upwardly above the pivot axle (7) and cooperating with a rest stop (12) to determine the rest position of the pedals, the pivot axle (7) of the pedals is pivotally mounted solely in the bearing bracket (9), in bearing openings (10), and the rest stop (12) is located on the supporting bracket (8).

4 Claims, 1 Drawing Sheet

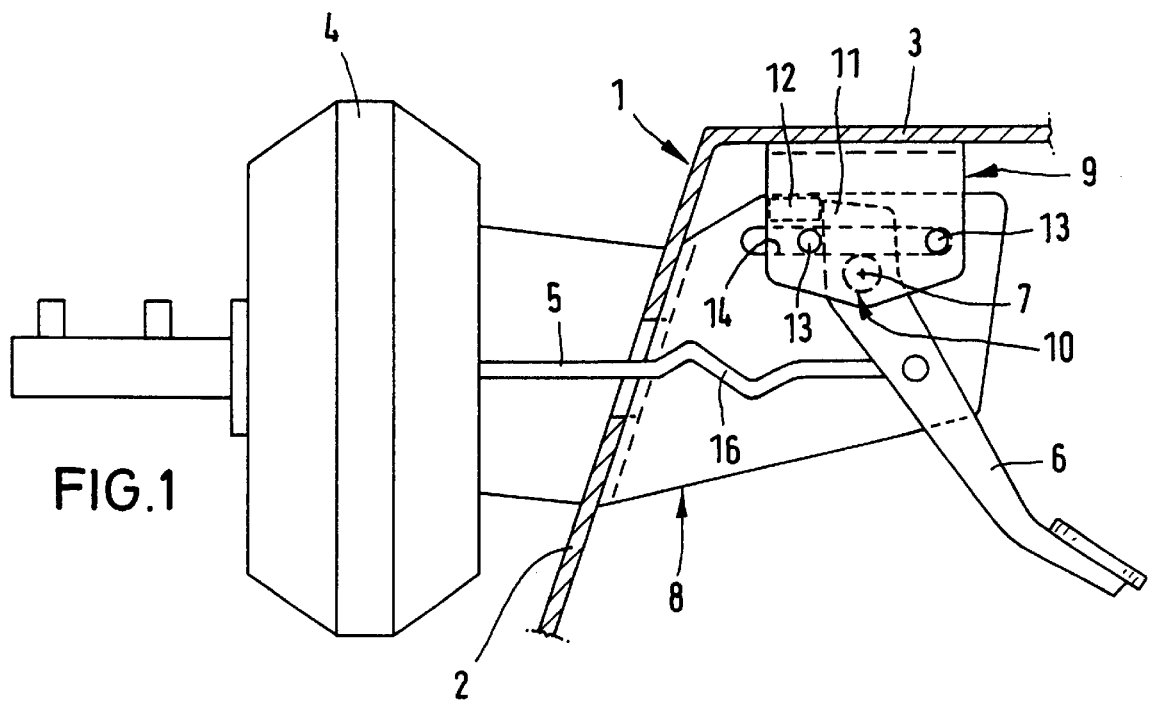
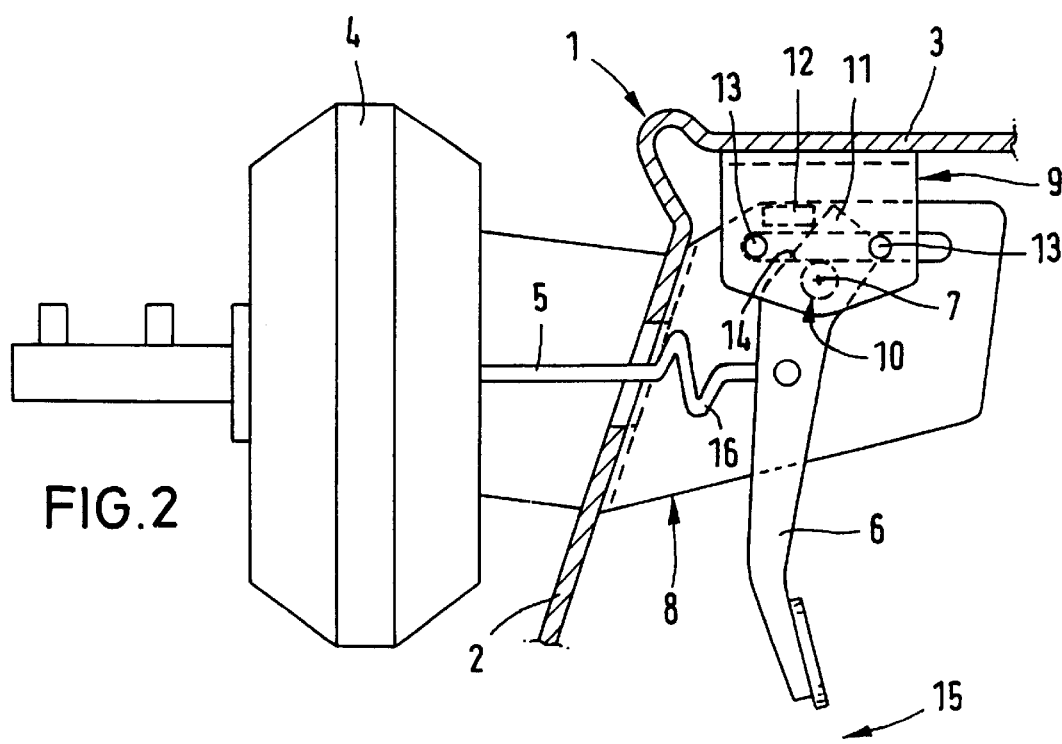

PEDAL MOUNTING APPARATUS FOR MOUNTING PEDALS IN MOTOR VEHICLES

FIELD OF THE INVENTION

The invention relates to a bearing bracket arrangement for pedals in motor vehicles.

BACKGROUND AND PRIOR ART

German specification DE 35 33 420 B1 discloses a bearing bracket arrangement for pedals in motor vehicles which comprises a first bearing bracket having its base fixed to a substantially vertical region of the bulkhead/cowl panel assembly of the motor vehicle which cooperates with a second, U-shaped, bearing bracket having its base fixed to a substantially horizontal region of the bulkhead/cowl panel assembly, in order to hold the pivot axle of the brake pedal in the two bearing brackets in a stable and pivotal manner.

If as a result of a frontal impact the substantially vertical region of the bulkhead/cowl panel assembly is displaced by the propulsion unit in the engine compartment, which has been displaced towards the rear, the two bearing brackets cooperate so that, as the first bearing bracket moves to the rear, the pivot axle of the pedal becomes uncoupled from the first bearing bracket and remains in its position in the second bearing bracket. This leads to the disadvantage that in moving to the rear the piston rod of the brake booster system, which engages below the pivot axle, applies a moment to the brake pedal which tends to pivot this pedal upwards and to the rear. However, such a movement is undesireable due to interference with the legs of the driver of the vehicle, which are situated in this region and in the case of a frontal impact are driven forwards.

It would therefore be desirable to provide a bearing bracket arrangement of the kind referred to which is designed so that in the event of a frontal impact and of a resulting deformation of the substantially vertical region of the bulkhead/cowl panel assembly the pedals are pivoted forward out of the region of the driver's legs, in order so far as possible to reduce the risk of injury.

SUMMARY OF TEE INVENTION

To this end the present invention provides a bearing bracket for pedals in motor vehicles comprising a first, optionally U-shaped, supporting bracket having its base fixed to a substantially vertical region of the bulkhead/cowl panel assembly and a second bearing bracket, preferably U-shaped, having its base fixed to a substantially horizontal region of the bulkhead/cowl panel assembly, wherein the pivot axle of the pedals, for example of a brake pedal, is held securely and pivotally, and wherein

- the pedals, e.g. a brake pedal, are provided with a stop arm projecting upwardly above the pivot axle and cooperating with a rest stop which determines the rest position of the pedals,
- the pivot axle of the pedals is pivotally mounted in bearing openings only in the second bearing bracket, and
- the rest stop is located on the first supporting bracket.

As a result of the pedals having a stop arm which projects above their pivot axle and determines their rest position, and of the stop cooperating therewith being mounted on the first bearing bracket above the pivot axle, in the event of the substantially vertical region of the bulkhead/cowl panel assembly being displaced to the rear a force imposes a pivoting movement on the pedals which withdraws them forwardly away from the region of the driver's feet and legs.

The piston rod for the brake booster, which in the case of a brake pedal engages below the pivot axle of the pedal, is designed in such a way that under the influence of the force of the displacement of the brake booster to the rear and the forward pivoting movement of the pedals the piston rod is deformed out of the way.

BRIEF DESCRIPTION OF THE DRAWINGS

The invention will now be described in more detail, by way of example, with reference to an embodiment shown in the accompanying drawings, in which:

FIG. 1 is a schematic side view of a bearing bracket arrangement in accordance with the invention for pedals in motor vehicles, as installed, and FIG. 2 is a side view of the bearing bracket arrangement in accordance with the invention for pedals in motor vehicles after deformation of the vertical region of the bulkhead/cowl panel assembly has taken place.

DETAILED DESCRIPTION OF PREFERRED EMBODIMENTS OF THE INVENTION

In FIGS. 1 and 2 a bulkhead/cowl panel assembly 1 is shown which consists essentially of two different regions, a substantially vertical region 2 and a substantially horizontal region 3. To the substantially vertical region 2 there is fixed in a known manner a brake booster 4, the piston rod 5 of which can be actuated by a brake pedal 6 which is pivotally mounted on a fixed pivot axle 7.

The pivot axle is not mounted in two separate bearing brackets, as in the prior art mentioned above. Rather, the present invention includes a supporting bracket 8 fixed to the substantially vertical region 2 of the bulkhead/cowl panel assembly 1 and having rearwardly extending sidewalls and a bearing bracket 9 fixed to the substantially horizontal region 3 of the bulkhead/cowl panel assembly 1. In this configuration, the pivot axle 7 is supported only by the bearing bracket 9 and is not connected to the supporting bracket 8.

It should be recognized by those skilled in the art that the bearing bracket 9, illustrated schematically, is referred to as a "bearing" bracket because it provides a rotatable securement for the pivot axle 7. It is generally formed from stamped sheet metal having sidewalls with apertures therein to receive ends of the pivot axle. The apertures are sized to allow rotation without undesirable radial play. It should be noted that the bearing bracket 9 could be secured to a tubular cross car beam, where one is provided to increase the rigidity of the bulkhead/cowl assembly.

The pedals, e.g. the brake pedal 6 shown in the embodiment, are provided with a stop arm 11 extending upwardly above the pivot axle 7, which together with a rest stop 12, determines the rest position of the suspended pedal.

According to the invention, however, the rest stop 12 is not located on the bearing bracket 9, but on the supporting bracket 8, so that if, as a result of a frontal impact, the substantially vertical region 2 of the bulkhead/cowl panel assembly 1 is deformed to the rear into the foot space of the vehicle it acts on the upper stop arm 11 of the pedals, e.g. of the brake pedal 6, and causes this pedal to pivot about its pivot axle 7 in such a way that its actuating end is moved still further away out of the driver's foot space.

In order to determine this desirable movement of the pedals 6 still more precisely and to give the pedal support the necessary stiffness for normal operation, according to further features of the invention guide pins 13 are fitted to the bearing bracket 9 which slide within with a slot 14 in the side limbs of the supporting bracket 8 in such a way that the inward movement of the supporting bracket 8 is controlled by the bearing bracket 9.

As can be seen from FIG. 2, in a displacement of the first supporting bracket 8 to the rear, a force pivots movement of the pedal 6 in the direction of the arrow 15. The piston rod 5 of the brake booster 4 must collapse to accommodate this travel. In the presently preferred embodiment, this is facilitated by forming a Z-shaped dog-leg 16 in the piston rod 5. In normal operation the dog leg is initially open, and can be collapsed together when subjected to a force exceeding a predetermined minimum, thereby ensuring that the corresponding deviation movement in the direction of the arrow 15 can occur.

The present invention is intentionally only shown in a schematic form, since one skilled in the art is obviously free to decide on a suitable shape of the two brackets—the supporting and bearing brackets 8 and 9—which cooperate together, and also to make use of any of a very wide variety of known possibilities for a form of the piston rod 5 which provides a lost motion or generally slidably telescoping movement.

The foregoing description presents the preferred embodiment of the present invention. Details of construction have been shown and described for purposes of illustration rather than limitation. Other modifications and alterations of the invention will no doubt occur to those skilled in the art that will come within the scope and spirit of the following claims.

What is claimed is:

1. A pedal mounting apparatus for mounting a pedal in a motor vehicle, said pedal mounting apparatus comprising:

a supporting bracket having a base fixed to a substantially vertical region of a bulkhead/cowl panel assembly;

a bearing bracket having a base fixed to a substantially horizontal region of said bulkhead/cowl panel assembly and having sidewalls extending therefrom;

a rest stop disposed on said supporting bracket;

a pivot axle pivotally mounting the pedal within apertures disposed within said sidewalls of said bearing bracket of the pedal; and a stop arm projecting upwardly from the pedal above said pivot axle and cooperating with said rest stop to determine a rest position of the pedal;

guide pins disposed in and extending between sidewalls of said bearing bracket; and slots disposed in sidewalls of said supporting bracket, said guide pins being engaged in said slots so as to control movement of said supporting bracket during deformation of said vertical region of the bulkhead/cowl panel assembly.

2. A pedal mounting apparatus according to claim 1, further comprises a piston rod extending between and interconnecting the pedal to a brake booster, said piston rod having collapsing means along its length to allow collapse of said piston rod under the application of a predetermined force.

3. A pedal mounting apparatus for mounting a pedal in a motor vehicle, said pedal mounting apparatus comprising:

a supporting bracket having a base fixed to a substantially vertical region of a bulkhead/cowl panel assembly;

a bearing bracket having a base fixed to a substantially horizontal region of said bulkhead/cowl panel assembly and having sidewalls extending therefrom;

a rest stop disposed on said supporting bracket; a pivot axle pivotally mounting the pedal within apertures disposed within said sidewalls of said bearing bracket of the pedal;

a stop arm projecting upwardly from the pedal above said pivot axle and cooperating with said rest stop to determine a rest position of the pedal;

a piston rod extending between and interconnecting the pedal to a brake boosters said piston rod having collapsing means along its length to allow collapse of said piston rod under the application of a predetermined force;

guide pins disposed in and extending between said sidewalls of said.bearing bracket; and slots disposed in sidewalls of said supporting bracket, said guide pins being engaged in said slots so as to control movement of said supporting bracket during deformation of said vertical region of the bulkhead/cowl panel assembly.

4. A pedal for mounting a pedal in a motor vehicle, said pedal mounting apparatus comprising:

a supporting bracket having a base fixed to a substantially vertical region of a bulkhead/cowl panel assembly;

a bearing bracket having a base fixed to a substantially horizontal region of said bulkhead/cowl panel assembly and having sidewalls extending therefrom;

a rest stop disposed on said supporting bracket;

a pivot axle pivotally mounting the pedal only within apertures disposed within said sidewalls of said bearing bracket of the pedal;

a stop arm projecting upwardly from the pedal above said pivot axle and cooperating with said rest stop to determine a rest position of the pedal;

a piston rod extending between and interconnecting the pedal to a brake booster, said piston rod having collapsing means along its length to allow collapse of said piston rod under the application of a predetermined force;

guide means for controllably guiding the direction of movement of said first supporting bracket;

guide pins disposed in and extending between sidewalls of said bearing bracket; and slots disposed in sidewalls of said supporting bracket, said guide pins being engaged in said slots so as to control movement of said supporting bracket during deformation of said vertical region of the bulkhead/cowl panel assembly.

* * * * *